United States Patent Office 2,979,480
Patented Apr. 11, 1961

2,979,480

VINYL CHLORIDE RESINS

Robert A. Piloni and George P. Rowland, Jr., Pottstown, Pa., assignors to The Firestone Tire & Rubber Company, Akron, Ohio, a corporation of Ohio No Drawing. Filed Jan. 4, 1957, Ser. No. 632,423

10 Claims. (Cl. 260—41)

This invention relates to novel carboxylic acid group-containing polymeric resins which are tolerant of alkaline pigments and certain reactive plasticizers, and to coating and like compositions based upon said resins.

Acrylic acid, maleic anhydride and other monomers containing actual or latent carboxylic acid groups are commonly copolymerized into resins in order to render them adhesive to metallic and other substrates. Unfortunately, the carboxylic acid groups in the resulting copolymers react with the alkaline inorganic pigments and with acid-sensitive plasticizers such as epoxy-type plasticizers which are commonly used in solvent-containing coating composition, and cause the compositions to gel.

Accordingly it is an object of this invention to provide novel resins having carboxylic acid groups therein.

Another object is to provide such resins which are tolerant of alkaline inorganic pigments and of certain plasticizers and the like containing centers reactive with acidic materials, for example epoxides.

A further object is to provide such resins having good adhesion to metals.

A still further object is to provide alkaline pigment coating compositions which have good adhesion to metals but which do not gel on mixing or storage.

SYNOPSIS OF THE INVENTION

The above and other objects are secured, in accordance with this invention, in copolymers having copolymerized therein vinyl chloride and an acid ester having the formula:

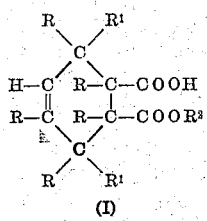

(I)

wherein

R, independently in each occurrence, represents a hydrogen atom, a halogen, a hydrocarbon group containing 1–10 carbon atoms, or a halohydrocarbon group containing 1–10 carbon atoms;

$R^1$, independently in each occurrence, may represent any of the groups which R may represent, and in addition, with the other $R^1$, may represent an alkylene group of from 1 to 4 carbon atoms, an oxygen atom or a sulfur atom bridging the atoms to which the two radicals $R^1$ are attached. Preferably, the sum of all the carbon atoms in the R and $R^1$ groups should not exceed 20, and $R^2$ is a hydrocarbon or halohydrocarbon group containing 1–30 carbon atoms and attached by one of its carbon atoms to the COO group of the formula, with the proviso that the carbon skeleton of the group $R^2$ may be interrupted or substituted with ether, thioether, ester, thioester or amide groups.

The resultant copolymers, by virtue of their carboxylic acid group content, have excellent adhesion to metallic and other substrates. They are nevertheless quite tolerant of alkaline pigments, and solvent solutions thereof containing dispersed alkaline pigments may be kept indefinitely without gelation. The polymer may contain from about 1% to about 30% of the acid ester (I), based upon the total weight of vinyl chloride and acid ester. In addition, the copolymer may contain copolymerized therein up to 50%, based on the total weight of the copolymer, of other compounds copolymerizable with vinyl chloride. Particularly advantageous copolymers, under this invention, are those produced from—

Table I

| | Percent by weight |
|---|---|
| A. Vinyl chloride | 55–80. |
| B. A polymerizable, monomeric neutral ester such as a maleate, fumarate, acrylate, vinyl carboxylate or the like. | 14–45. |
| C. Half ester of Formula I above | 1–10. |
| D. Molecular weight reducing monomer or chain transfer agent. | sufficient to yield a polymer having a relative viscosity of 1.1–1.7 in 1% cyclohexanone solution. |

It will be understood that the above recipe may also contain small amounts, say up to 35%, of other extraneous monomers discussed under this heading below. Also the molecular weight reducing agent (D) may be omitted if some other technique is employed which will bring the resin to the relative viscosity cited. These copolymers are readily soluble in high concentrations in a wide variety of cheap solvents to form coating compositions which tolerate the presence of alkaline pigments without gelation. These copolymers are also compatible with alkyd resins, both in coating solutions, and in the coating films produced therefrom.

HALF-ESTERS OF FORMULA I

The monomers suitable for the acidic monomers of Formula I are essentially 1,2,3,6-tetrahydrophthalic acid half-esters which may be substituted in the nucleus by hydrocarbon, halogen or halohydrocarbon groups. A convenient source for such monomers is provided by the Diels-Alder condensation of maleic or chloromaleic anhydride with conjugated diolefines or furans to form an anhydride adduct, followed by alcoholysis of the anhydride to form the half-ester I. It will be understood that the $R^2$ group of Formula I may be interrupted by ether, ester, thioether, thioester, amide and other innocuous groups which will not interfere with the polymerization. Suitable compounds are illustrated in the half-ester of 1,2,3,6-tetrahydro - cis - phthalic acid such as its methyl, ethyl, 2-ethoxyethyl, 2-acetoxyethyl,

—$CH_2$—COO—$C_2H_5$ propyl, isopropyl, butyl, pentyl, hexyl, phenyl, p-tolyl, naphthyl, octyl, 2-ethyl hexyl and dodecyl half-esters; the half-esters of 3,6-endomethylene-1,2,3,6 - tetrahydro - cis-, phthalic acid, such as its methyl, ethyl, propyl, butyl, secondary butyl, 2-ethyl hexyl, dodecyl and octadecyl half-esters; and similar half-esters of 7-oxa-bicyclo (2,2,1)-5-heptene-2,3-dicarboxylic acid, 1,2,3,10a - tetrahydrophenanthrene-1,2-dicarboxylic acid, 5-isopropyl - 7 - methyl-bicyclo - 2,2,2-7 - octene - 2,3 - dicarboxylic anhydride, 1,2,3,6-tetrahydro-4,5 - dichlorophthalic acid, 1,2,3,6 - tetrahydro - 1 - chlorophthalic acid and the like. It will be understood that the acidic monomer need not be a single pure compound, but may be constituted of a mixture of compounds above indicated as suitable.

THE MONOMERIC NEUTRAL POLYMERIZABLE ESTERS

The polymerizable esters (C) of Table I above include neutral maleates, chloromaleates, acrylates, methacrylates, and vinyl carboxylates. The maleate and fumaric dihydrocarbon esters are the most highly preferred, and may be described as esters in which the radicals esterified by the maleic, chloromaleic, or fumaric acid are hydrocarbon radicals which contain 1–30 carbon atoms and are saturated, i.e., free from ethylenic unsaturation, although they may contain aromatic groups. It will also be understood that the hydrocarbon groups may be interrupted by ether, thioether, thioester, amide and other innocuous groups which will not interfere with the polymerization. Acrylates and methacrylates embracing the same radical loading in their ester groups may also be used. Suitable hydrocarbon, and interrupted and substituted hydrocarbon groups which may be esterified with the maleic, fumaric, chloromaleic, acrylic and methacrylic groups include, for instance, ethyl groups, normal- and iso-propyl groups, normal-, secondary- and tertiary-butyl groups, the several pentyl groups, n-hexyl groups, cyclohexyl groups, 2-ethyl hexyl groups, phenyl groups, benzyl groups, naphthyl groups, 2-ethoxy ethyl groups, the —$CH_2COOC_2H_5$ and similar glycolate ester groups, and the like. Vinyl esters may be esters of hydrocarbon monocarboxylic acids containing from 1 to 30 carbon atoms, such as formic, acetic, propionic, stearic, benzoic and like acids. Specific exemplary esters include dimethyl maleate, dimethyl fumarate, diethyl maleate, diisopropyl maleate, diisobutyl maleate, di-secondary butyl maleate, di(2-ethyl hexyl) maleate, di(cyclohexyl maleate), diphenyl maleate, dibenzyl maleate, 2-ethyl-hexyl acrylate, n-butyl acrylate, ethyl acrylate, ethyl methacrylate, vinyl acetate, vinyl propionate, vinyl butyrate, vinyl stearate, vinyl 2-ethyl hexoate, vinyl laurate, vinyl caproate and vinyl pelargonate. The esters used need not be pure compounds; thus mixtures of individually suitable dihydrocarbon maleates, dihydrocarbon chloromaleates, dihydrocarbon fumarates, hydrocarbon acrylates, hydrocarbon methacrylates, hydrocarbon chloroacrylates and vinyl carboxylates may be used in lieu of pure esters of these types. It will also be understood that the maleates and fumarates will be indistinguishable in the final product resins, since their unsaturation will be obliterated in the polymerization.

THE PREPARATION OF THE RESINS OF THIS INVENTION

The polymeric resins of this invention may be prepared by mixing together the monomeric constituents and subjecting them to any of the usual polymerization systems and conditions, for instance in solution in solvents, in emulsion in aqueous media, or in suspension in aqueous media, using free-radical-generating catalysts and conditions. In practical production, it is preferred to polymerize the monomers in aqueous suspension. In general this technique involves suspending the monomers in an aqueous medium containing non-micelle-forming suspending agents. Suspending agents suitable for this purpose are hydrophilic high polymeric materials such as gelatin, polyvinyl alcohol, polyacrylic acid, polymaleic acid, methyl cellulose, polymeric tertiary amine phosphates, and the like. The aqueous medium constitutes about at least half of the entire polymerization mass. The reaction is promoted by the presence of free-radical-generating agents soluble in the monomer phase of the suspension, such as benzoyl peroxide, perbenzoic acid, p-chlorobenzoyl peroxide, t-butyl hydroperoxide and the like. The aqueous phase and the monomer phase are agitated together so as to suspend the latter in the former, and the temperature of the mass is adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated mechanically, as by filtration, centrifugation or the like.

MOLECULAR WEIGHT MODIFYING COMONOMERS, REAGENTS AND TECHNIQUES

As noted above, it is desirable to conduct the polymerization in such a way that the relative viscosity at 25° C. of the polymeric product, in a solution in cyclohexanone containing 1% of the polymer, based on the weight of solution, shall be in the range 1.1 to 1.7. This may be accomplished by incorporating, into the monomers entering the reaction, various materials which tend to lower the molecular weight, or by conducting the reaction at uncustomary high temperatures. For instance trichloroethylene, when incorporated into the polymerization mass to the extent of 1.5–6.0%, based on the total weight of monomers (including the trichloroethylene) in the reaction medium, will bring the molecular weight of the polymer down to the desired range. Likewise there may be employed any saturated halogenated hydrocarbons, preferably those containing from 1 to 4 carbons, examples of these being the halogenated methanes such as carbon tetrachloride, carbon tetrabromide, bromochlorodifluoromethane, bromoform, methyl chloride, methyl bromide, methyl iodide, chloroform, iodoform, methylene dichloride, methylene dibromide and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes such as n-propyl chloride, n-propyl iodide, isopropyl chloride, isopropyl bromide, n-butyl chloride, 1,4-dichlorobutane, t-butyl chloride, and the like. Suitable halogenated hydrocarbons containing more than 4 carbon atoms include, for instance, amyl chloride, dodecyl chloride and the like. Likewise there may be employed any halogenated ethylenically unsaturated hydrocarbon which is not readily copolymerizable with vinyl chloride. Vinyl chloride itself, vinyl bromide, vinyl fluoride, vinyl iodide, vinylidene chloride, vinylidene bromide, vinylidene iodide, vinylidene chlorobromide, vinylidene chloroiodide, vinylidene bromoiodide, vinylidene fluoroiodide, vinylidene fluorobromide, and vinylidene fluorochloride are thus to be excluded from the suitable unsaturated halohydrocarbons on this basis. Suitable unsaturated halogenated hydrocarbons (i.e., other than those listed above as unsuitable) will be seen to include for instance cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene, 1-chloro-2-octadecene, and the like. In general, it will be preferred to employ those unsaturated halogenated compounds containing from 1 to 4 carbon atoms, although higher molecular weight compounds may also be used. It will be understood that, instead of a single pure compound tending to reduce the molecular weight, there may be employed any mixture of such compounds which are individually suitable. Both the saturated and unsaturated halogenated hydrocarbons should be used within the cited proportions of 1.5–6.0% based on the weight of monomers. Other known molecular-weight-controlling additives may also be used, such as p-toluene sulfonyl chloride, $$Br_2H_2CCOOC_2H_5$$

N-chlorophthalimide, formaldehyde and the like. Likewise the same result may be secured by carrying out the polymerization at relatively high temperatures, in the range of 70°–85° C., preferably 74–77° C. instead of the customary lower temperatures on the order of 50°–60° C., the additives being omitted in such cases.

SUBORDINATE COMONOMERS

As noted above, the copolymers of this invention may contain copolymerized therein, in addition to the essential vinyl chloride and half-ester of Formula I, and in addition to the unsaturated neutral esters and molecular weight reducing agent if these be present, other extraneous monomers copolymerizable with vinyl chloride. Such extraneous monomers should be present in quantities small enough, say up to 35%, based on the total weight of the copolymers, so as not to obliterate the essential character of the underlying vinyl chloride half-ester polymeric structure. Suitable extraneous monomers of this character include for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. For a fairly complete list of materials known to polymerize with vinyl chloride, reference may be had to Krczil, "Kurzes Handbuch der Polymerisations-Technik—II. Mehrstoff Polymerisation," Edwards Bros. Inc., 1945, pp. 735–747, the items under "Vinyl Chlorid." As a rough rule, the criterion of a practical comonomer for use with vinyl chloride to produce copolymers containing 80% or more of vinyl chloride, is that (on a mole percentage basis) an initial charge of 96% vinyl chloride, balance comonomer, shall yield an initial copolymer containing ($a$) at least 90% vinyl chloride and ($b$) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $$Q_{\text{vinyl chloride}}=.03 \text{ and } e_{\text{vinyl chloride}}=.3$$

$$4.1 > \frac{\frac{.029e^{-.3(.3-e_2)}}{Q_2}+.04}{1.33Q_2 e^{e_2(.3-e_2)}+.96} > .37$$

Instead of the single unsaturated comonomers of the type above indicated, mixtures of such comonomers may enter into the copolymers, it being understood that the total quantity thereof shall be small enough (i.e., not over 35% based on the weight of the copolymer) that the essential character of the polyvinyl chloride chain is retained.

ALKALINE PIGMENT CONTAINING COATING COMPOSITIONS

An important phase of this invention consists in coating compositions containing alkaline pigments. Alkaline inorganic pigments which are desirable constituents of coating compositions are a well-known class of materials and include for instance zinc oxide, basic lead acetate, magnesium oxide, calcium carbonate, aluminum powder, magnesium powder, magnesium oxide, magnesium carbonate, barium oxide, barium carbonate, lead oxides, red lead, lead peroxides, heavy metal driers such as manganese linoleate, copper stearate, basic soaps such as calcium stearate, zinc chromate, lead chromate, magnesium chromate and the like. The coating compositions essentially comprise a solvent solution of a resin in accordance with this invention and, dispersed in the solution, any desired alkaline pigment. In contrast to all other coatings in which a combination of an acidic resin with a basic pigment has been attempted, no reaction occurs between the resin and the pigment, and the solution remain fluent and workable indefinitely. Furthermore, the resins of this invention may be formulated with plasticizers and other additives having epoxy groups therein, such as epoxidized soyabean oil and other fatty glyceride oils, epoxidized oleic, linoleic and other fatty acids, and esters of these epoxidized fatty acids with alcohols and polyalcohols such as ethanol, ethylene glycol, pentaerythritol, and the like. Notwithstanding the nonreactivity of the resins of this invention, the coatings containing these resins are none the less strongly adherent to metallic and other surfaces. Particularly when the resins are produced from ingredients as set forth in Table I above, the coating compositions may be formulated with cheap solvents, and with alkyd resins. Suitable primary solvents for use in the coating compositions of this invention include all of the usual vinyl resin solvents, such as ketone solvents on the order of dimethyl ketone, methyl ethyl ketone, methyl isopropyl ketone, acetyl acetone, cyclohexanone, acetonyl acetone, and the like; ester solvents such as ethyl acetate, amyl acetate, ethyl butyrate and the like; and miscellaneous solvents such as the nitroparaffins, tetrahydrofuran and the like. Mixtures of any of these solvents may also be employed. Likewise, the resins of this invention, particularly those in accordance with Table I above, will tolerate considerable amounts non-solvent hydrocarbon diluents, such as toluene, xylene, benzene, mineral spirits, V.M. & P. naphtha. The ketone solvents named above will tolerate considerable amounts of such diluents while retaining the resins of this invention in solution; ratios of hydrocarbon: ketone as high as 3:1 may be employed. The resins and coatings of this invention accordingly find extensive use in coating compositions such as paints for use on metallic and other surfaces, particularly in coatings for metallic equipment subject to outside exposure conditions such as railway vehicles, automobiles, tractors, vending and dispensing machinery and the like. The resins of this invention are also very suitable for use in solvent-based inks for printing upon plastic and other surfaces. In view of their excellent adhesion to a wide variety of surfaces, the resins of this invention are further admirably adapted for use in the formulation of adhesives for joining metal, wood, plastics, and the like.

With the foregoing general discussion in mind, there are given herewith detailed examples of the practice of this invention. All parts given are by weight.

EXAMPLE I

A series of copolymers was made from mixtures of vinyl chloride, di-n-butyl maleate, monohydrogen mono-n-butyl ester of 3,6-endomethylene-1,2,3,6-tetrahydro-cis-phthalic acid (i.e., a half-ester) and trichloroethylene, in the proportions set out in Table III below. In each case the monomers, together with 175 parts of water, 0.8 part of benzoyl peroxide and the indicated amount of suspending agent, were charged into a reactor which had previously been purged with vinyl chloride vapor, and polymerized at 65° C. for 18 hours with an agitation intensity of 5 on the Pfaudler scale. At the end of this time, the reactor was vented, and the slurry of polymer discharged and filtered to recover the polymer, which was washed on the filter with water and dried. Tests were made upon the polymers, as follows.

Alkali tolerance: Ten milliliters of methyl isobutyl ketone were chilled to Dry Ice temperature, 1 gram of the resin under test was added, and the mixture stirred while permitting it to warm up to 25° C. The resulting solution was kept at 60° C. for 18 hours, cooled to 25° C., and the concentration adjusted to provide a 10% solution of resin in the solvent. To the resultant solution was added 0.5 g. of basic lead acetate, and the resultant mixture stirred as needed to keep the basic lead acetate in suspension. A number of commercial vinyl chloride copolymers containing carboxylic acid groups attached to the polymeric chains were subjected to this test, and all converted the solution to a solid gel within twenty minutes. By way of contrast, the solutions containing the resins of this invention showed no tendency toward gelation after a year of storage. Corresponding results were obtained with other alkaline pigments such as zinc oxide, magnesia, calcium carbonate, powdered aluminum, magnesium carbonate, lead tetraoxide, zinc chromate, lead chromate, and bronze powder.

Alkyd compatibility:

| | Parts |
|---|---|
| Resin under test | 25 |
| Methyl ethyl ketone | 75 |
| Alkyd resin paste (paste containing 60% of "2KB551" an alkyd resin manufactured by The Glidden Co., balance petroleum spirits) | 40 |

Each of the resins of Table III was tested for alkyd compatibility. In each case, the resin under test was dissolved in the methyl ethyl ketone, and the alkyd resin paste stirred in. The resultant solution was clear and homogeneous in every case. Likewise, a microscope slide was dipped into the solution, and dried for 48 hours. In each case, a perfectly clear film was obtained. The solutions were also coated onto strips of sand-blasted and degreased steel, and dried to yield hard, clear, strongly adherent coatings.

Tolerance of epoxidized material:

| | Parts |
|---|---|
| Resin No. 1 of Table III or a commercial vinyl chloride copolymer designed for solvent application | 25 |
| Methyl isobutyl ketone | 25 |
| Toluene | 50 |
| An epoxidized polyester plasticizer ("Paraplex G-62," manufactured by Rohm & Haas) | 5 |

Two solutions were made up in accordance with the foregoing recipe, and were stored in bottles in an oven at 60° C. Samples were withdrawn at intervals, and the viscosities determined on a Brookfield viscosimeter using a No. 2 spindle at 30 r.p.m. Tabulated herewith are the results. It will be seen that the resin of this invention remained substantially unchanged, whereas the commercial resin thickened rapidly.

*Table II*

| Days of Storage | Viscosity of Sample (centipoises) | |
|---|---|---|
| | Solution of Resin of This Invention | Solution of Commercial Resin |
| 0 [1] | 68 | 876 |
| 7 | 64 | [2] 1,475 |
| 14 | 74 | [2] 2,275 |
| 21 | 60 | [3] 15,200 |
| 28 | 66 | ([4]) |

[1] Sample tested twenty minutes after preparation.
[2] Viscosity determined with No. 2 spindle at 12 r.p.m.
[3] Viscosity determined with No. 3 spindle at 6 r.p.m.
[4] Too viscous to measure.

| Monomers (parts by weight) | | | | Suspending Agent [1] (parts by weight) | Resin No. |
|---|---|---|---|---|---|
| Vinyl Chloride | Dibutyl Maleate | Half-Ester | Trichloroethy- | | |
| 67.6 | 25.8 | 3.2 | 3.2 | .2 | 1 |
| 67.6 | 21.0 | 8.1 | 3.2 | .2 | 2 |
| 67.6 | 16.1 | 12.9 | 3.2 | .2 | 3 |
| 67.6 | 8.1 | 21.0 | 3.2 | .2 | 4 |
| 67.6 | 0.0 | 29.1 | 3.2 | .2 | 5 |
| 67.6 | 21.0 | 8.1 | 3.2 | .5 | 6 |
| 67.6 | 12.9 | 16.1 | 3.2 | .5 | 7 |
| 67.6 | 27.5 | 1.6 | 3.2 | .5 | 8 |
| 67.6 | 28.3 | .8 | 3.2 | .5 | 9 |
| 68.8 | 26.4 | 3.3 | 1.4 | .25 | 10 |
| 69.8 | 23.3 | 4.7 | 2.0 | [2] .05 | 11 |

[1] A copolymer of 50/50 vinyl methyl ether/maleic anhydride, except where otherwise noted.
[2] GM-650, the phosphate salt of a polymeric tertiary amine manufactured by Rohm & Haas, Inc., was used as the suspending agent in this run.

EXAMPLE II

| | Parts |
|---|---|
| Vinyl chloride | 42 |
| Di-n-butyl maleate | 15 |
| Methyl acid ester of 3,6-endomethylene-1,2,3,6-tetrahydro-cis-phthalic acid | 3 |
| Trichloroethylene | 1.47 |
| Water (deionized) | 106 |
| Benzoyl peroxide | 0.5 |
| Copolymer of maleic anhydride and methyl vinyl ether in approximately equal parts, manufactured by General Aniline & Film as "PVMMA" | 0.5 |

The above ingredients were charged into a reactor previously purged with vinyl chloride vapor, and agitated at 65° C. for 25 hours. At the end of this time, the reactor was cooled to 25° C. and vented, and the slurry of polymer was discharged and filtered to recover the polymer. The polymer was washed on the filter with deionized water and dried. The polymer had a relative viscosity of 1.26 in 1% cyclohexanone solution at 25° C. The polymer exhibited good alkali tolerance, alkyd compatibility and adhesion to steel by the tests described in Example I.

EXAMPLE III

| | Parts |
|---|---|
| Vinyl chloride | 42 |
| Di-n-butyl maleate | 15 |
| Secondary butyl acid ester of 3,6-endomethylene-1,2,3,6-tetrahydro-cis-phthalic acid | 3 |
| Trichloroethylene | 1.47 |
| Water (deionized) | 106 |
| Benzoyl peroxide | 0.5 |
| Copolymer of maleic anhydride/methyl vinyl ether (as in Example II) | 0.05 |

The above ingredients were agitated together in a closed autoclave at 65° C. for 18 hours. The autoclave was then cooled to 25° C. and vented, and the polymer slurry discharged and filtered to recover the polymer. The polymer was washed with water and dried. The product had a relative viscosity of 1.24 in 1% solution in cyclohexanone at 25° C. and showed good alkali tolerance, adhesion to metals and alkyd compatibility by the tests of Example I.

EXAMPLE IV

The procedure of Example III was exactly repeated, except that the 2-ethyl-hexyl acid ester of 3,6-endomethylene-1,2,3,6-tetrahydro-cis-phthalic acid was used in place of the secondary butyl acid ester. The polymer had a relative viscosity of 1.26 in 1% cyclohexanone solution at 25° C. and showed good alkali tolerance, alkyd compatibility and adhesion to steel by the tests of Example I.

EXAMPLE V

| | Parts |
|---|---|
| Vinyl chloride | 45 |
| Di-n-butyl maleate | 15 |
| n-Butyl acid ester of 3,4-tetrahydrophthalic acid | 3 |
| Trichloroethylene | 1.47 |
| Water | 100 |
| Benzoyl peroxide | 0.5 |
| Copolymer of maleic anhydride/methyl vinyl ether (as in Example II) | 0.05 |

The above ingredients were charged into a polymerization vessel, and a small portion (about 3 parts) of vinyl chloride permitted to evaporate to purge the free space in the reactor. The vessel was then closed, the temperature raised to 65° C., and agitation applied for 20 hours. The vessel was then cooled to 25° C. and vented, and the polymer recovered as in the preceding examples. The polymer had an intrinsic viscosity of 1.24, and had fair adhesion to steel and good alkali tolerance and compatibility with alkyd resins by the tests of Example I.

EXAMPLE VI

| | Parts |
|---|---|
| Vinyl chloride | 55 |
| n-Butyl acid ester of 3,6-endomethylene tetrahydro-cis-phthalic acid | 5 |
| Trichloroethylene | 2 |
| Water (deionized) | 150 |
| Copolymer of maleic anhydride/methyl vinyl ether (as in Example II) | .1 |
| Benzoyl peroxide | .5 |

The above ingredients were charged into an autoclave, the free space of which was purged with vinyl chloride vapor, and reacted at 65° C. for 24 hours. The autoclave was then cooled to 25° C., and vented, and the polymer slurry discharged and filtered to recover the polymer. The polymer had a relative viscosity of 1.31 in 1% cyclohexanone solution and was incompatible with alkyds. A 20% solution of the resin in methyl ethyl ketone was painted upon a sandblasted steel surface, and dried to give a film having excellent adhesion to the steel. The polymer had good alkali tolerance by the test of Example I.

EXAMPLE VII

| | Grams |
|---|---|
| Vinyl chloride | 55 |
| n-Butyl acid ester of 3,6-endomethylene-tetrahydro-cis-phthalic acid | 5 |
| Benzoyl peroxide | 0.5 |
| Polyamine phosphate ("GM-650," a product of Rohm & Haas Co.) | 0.05 |
| Water | 100 ml |

The above ingredients were sealed into a bottle previously flushed with nitrogen, and the sealed bottle tumbled in a water bath at 65° C. for 24 hours. The bottle was then cooled to 25° C. and vented, and the polymer slurry discharged and filtered to recover the polymer. The polymer was dried and made up into a 10% cyclohexanone solution, and 75% (by weight of the dissolved resin) of basic lead acetate dispersed therein. The solution remained gel free for a month (after which the test was discontinued) and gave tightly adherent coatings on cleaned, sandblasted steel.

EXAMPLE VIII

| | Grams |
|---|---|
| Vinyl chloride | 42 |
| n-Butyl acid ester of 3,6-endomethylene-tetrahydro-cis-phthalic acid | 3 |
| Trichloroethylene | 2 |
| 2-ethyl-hexyl acrylate | 15 |
| Benzoyl peroxide | 0.5 |
| Water | 100 |
| Polyamine phosphate ("GM-650," a product of Rohm & Haas Co.) | 0.1 |

The above ingredients were sealed into a bottle previously flushed with nitrogen, and tumbled in a water bath at 65° C. for 24 hours. The bottle was then cooled to 25° C. and vented, and the polymer slurry discharged and filtered to recover the polymer. The polymer was dried and made up into a 10% cyclohexanone solution, and 75% (by weight of the dissolved resin) of basic lead acetate dispersed therein. The solution remained clear indefinitely and, when coated on steel, provided coatings of excellent adhesion. The solution was also tolerant of alkyd resins incorporated therein.

EXAMPLE IX.—PAINT FORMULATIONS

| | Parts |
|---|---|
| Resin (Resin No. 1 of Table III) | 25 |
| Methyl isobutyl ketone | 25 |
| Toluene | 49 |
| Propylene oxide | 1 |
| Pigment: | |
| Red lead | 100 |
| or | |
| Whiting | 75 |
| or | |
| Zinc oxide | 25 |
| or | |
| Lithopone | 80 |
| or | |
| Titanium dioxide | 20 |
| or | |
| Zinc chromate | 100 |

A series of paint formulations was made up in accordance with the foregoing schedule, using the several different pigments in the respective several different paint formulations. The formulations were sealed in standard 5-gallon snap-top paint cans, and stored at temperatures ranging 15°–35° C. for 6 months. The cans were then opened, and the paint formulations therein all found to be of unimpaired fluidity. Similar compositions with other commercial acid-group-containing vinyl chloride resins gave solid and irreversible gels within a very short time after preparation. The paint formulations prepared in accordance with the above schedule all gave excellently adherent coatings on sandblasted and degreased steel.

From the foregoing general disclosure and detailed specific examples, it will be seen that this invention provides novel synthetic resins, and coating formulations containing those resins, which are characterized by concurrent good adhesion to metallic and other surfaces and freedom from objectionable interaction with alkaline pigments. The starting materials, i.e., the conventional monomers and the tetrahydrophthalic type half esters, are cheaply and readily available.

What is claimed is:

1. A resin characterized by good adhesion to metallic and other surfaces, and by tolerance of alkaline pigments, comprising a copolymer of (A) 55–80% of vinyl chloride, (B) 14–45% of a dihydrocarbon ester of maleic acid in which the esterifying hydrocarbon groups contain 1–30 carbon atoms and (C) 1–10% of an acid ester having the formula

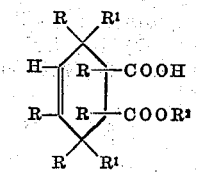

wherein R, independently in each occurrence, represents a radical selected from the group consisting of hydrogen, a halogen, hydrocarbon groups containing 1–3 carbon atoms and halohydrocarbon groups containing 1–3 carbon atoms, $R^1$, independently in each occurrence, represents a radical selected from the group consisting of hydrogen, a halogen, hydrocarbon groups containing 1–3 carbon atoms, halohydrocarbon groups containing 1–3 carbon atoms, and, together with the other $R^1$, alkylene groups of 1–2 carbon atoms bridging the carbon atoms in the formula to which the radicals R and $R^1$ are attached, the sum of all the carbon atoms in the R and $R^1$ radicals being not in excess of 20, and $R^2$, independently in each occurrence, represents a radical selected from the group consisting of hydrocarbon and halohydrocarbon groups containing 1–30 carbon atoms, and (D) up to 35% of a different ethylenically unsaturated monomer copolymerizable with vinyl chloride, said percentages being on the basis of the weight of the monomeric units copolymerized in the copolymer, and said copolymer having a relative viscosity, in 1% cyclohexanone solution, of 1.1 to 1.7.

2. The resin of claim 2, wherein the acid ester (C) is an ester of 3,6-endomethylene tetrahydro-cis-phthalic acid.

3. The resin of claim 2, wherein the monomer (D) is trichloroethylene and is present to the extent of 1.5–6.0%, on the basis of the weight of monomeric units copolymerized in the copolymer.

4. A coating composition comprising a solvent, an alkaline pigment, and a resin comprising a copolymer of (A) 55–80% of vinyl chloride, (B) 14–45% of a dihydrocarbon ester of maleic acid in which the esterifying hydrocarbon groups contain 1–30 carbon atoms and (C) 1–10% of an acid ester having the formula

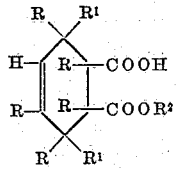

wherein R, independently in each occurrence, represents a radical selected from the group consisting of hydrogen, a halogen, hydrocarbon groups containing 1–3 carbon atoms and halohydrocarbon groups containing 1–3 carbon atoms, $R^1$, independently in each occurrence, represents a radical selected from the group consisting of hydrogen, a halogen, hydrocarbon groups containing 1–3 carbon atoms, halohydrocarbon groups containing 1–3 carbon atoms, and, together with the other $R^1$, alkylene groups of 1–2 carbon atoms bridging the carbon atoms in the formula to which the radicals R and $R^1$ are attached, the sum of all the carbon atoms in the R and $R^1$ radicals being not in excess of 20, and $R^2$, independently in each occurrence, represents a radical selected from the group consisting of hydrocarbon and halohydrocarbon groups containing 1–30 carbon atoms, and (D) up to 35% of a different ethylenically unsaturated monomer copolymerizable with vinyl chloride, said percentages being on the basis of the weight of the monomeric units copolymerized in the copolymer, and said copolymer having a relative viscosity, in 1% cyclohexanone solution, of 1.1 to 1.7.

5. A coating composition according to claim 4, wherein the acid ester (C) is an ester of 3,6-endomethylene tetrahydro-cis-phthalic acid.

6. A coating composition according to claim 4, in which the monomer (D) is trichloroethylene, and is present to the extent of 1.5–6.0% on the basis of the weight of the monomeric units copolymerized in the copolymer.

7. A resin characterized by good adhesion to metallic and other surfaces and by tolerance of alkaline pigments, comprising a copolymer of 55–80% of vinyl chloride, 15–45% of dibutyl maleate, 1–10% of the monobutyl acid ester of 3,6-endomethylene tetrahydro-cis-phthalic acid, and 1.5–6.0% of trichloroethylene, the percentages being based on the total weight of monomers in the resin.

8. A resin characterized by good adhesion to metallic and other surfaces and by tolerance of alkaline pigments, comprising a copolymer of 55–80% of vinyl chloride, 15–45% of dibutyl maleate, 1–10% of the mono-methyl acid ester of 3,6-endomethylene tetrahydro-cis-phthalic acid, and 1.5–6.0% of trichloroethylene, the percentages being based on the total weight of monomers in the resin.

9. A coating composition comprising a solvent, an alkaline inorganic pigment, and a resin comprising a copolymer of 55–80% of vinyl chloride, 15–45% of dibutyl maleate, 1–10% of the mono-butyl acid ester of 3,6-endomethylene tetrahydro-cis-phthalic acid, and 1.5–6.0% of trichloroethylene, the percentages being based on the total weight of monomers in the resin.

10. A coating composition comprising a solvent, basic lead acetate, and a resin comprising a copolymer of 55–80% of vinyl chloride, 15–45% of dibutyl maleate, 1–10% of the mono-butyl acid ester of 3,6-endomethylene tetrahydro-cis-phthalic acid, and 1.5–6.0% of trichloroethylene, the percentages being based on the total weight of monomers in the resin.

References Cited in the file of this patent

UNITED STATES PATENTS

| | | |
|---|---|---|
| Re. 24,206 | Rowland et al. | Aug. 28, 1956 |
| 2,222,928 | Alexander | Nov. 26, 1940 |
| 2,359,038 | Hopff et al. | Sept. 26, 1944 |
| 2,413,673 | Sears | Dec. 31, 1946 |
| 2,656,295 | Locke | Oct. 20, 1953 |
| 2,706,721 | Caldwell | Apr. 19, 1955 |

OTHER REFERENCES

Lucas: Organic Chemistry, American Book Co. (1935), pp. 167–168.